United States Patent

Weston

[11] Patent Number: 5,816,101
[45] Date of Patent: Oct. 6, 1998

[54] TRANSMISSION AND SHIFT MECHANISM

[76] Inventor: Bevan Weston, 16637 N. 21st St., Phoenix, Ariz. 85022

[21] Appl. No.: 689,733

[22] Filed: Aug. 13, 1996

[51] Int. Cl.[6] .................................................. F16H 3/08
[52] U.S. Cl. ............................ 74/331; 74/333; 74/483 R
[58] Field of Search ............................ 74/331, 325, 333, 74/335, 483 R

[56] References Cited

U.S. PATENT DOCUMENTS

| | | | |
|---|---|---|---|
| 1,317,191 | 9/1919 | Jensen .......................................... | 74/483 |
| 2,953,035 | 9/1960 | Herr, Jr. ...................................... | 74/483 |
| 3,138,965 | 6/1964 | Brey et al. .................................. | 74/331 |
| 3,757,598 | 9/1973 | Van Dest .............................. | 74/473 R |
| 4,023,443 | 5/1977 | Usui et al. . | |
| 4,068,537 | 1/1978 | Wolfe ......................................... | 74/477 |
| 4,531,418 | 7/1985 | Takahasi et al. .......................... | 74/339 |
| 4,550,628 | 11/1985 | Yarnell .............................. | 74/483 R X |
| 4,873,882 | 10/1989 | Goscenski, Jr. . | |
| 5,030,179 | 7/1991 | Ganoung . | |
| 5,052,245 | 10/1991 | Kigoshi ............................. | 74/483 R X |
| 5,309,782 | 5/1994 | Seaman .................................. | 74/335 X |
| 5,390,561 | 2/1995 | Stine ......................................... | 74/331 |
| 5,471,893 | 12/1995 | Newbigging .............................. | 74/335 |

OTHER PUBLICATIONS

Drawing No. STA–200–DC entitled "STA Gearbox (Die–Cast) Layout & Parts List" and dated Sep. 13, 1990, which illustrates a transmission believed to be in public use or on sale in the United States more than one year prior to the filing date of the present application.
4 color copies of photographs of a shift mechanism believed to have been in public use or on sale in the United States more than one year prior to the filing date of the present application.

Primary Examiner—Charles A. Marmor
Assistant Examiner—Peter T. Kwon
Attorney, Agent, or Firm—Morgan & Finnegan, L.L.P.

[57] ABSTRACT

A manual transmission comprising a first pivot member operatively connected to a first coupling unit on an output shaft and is selectively rotatable to drive the first coupling unit between first, neutral and second positions. A second pivot member is operatively connected to a second coupling unit on the output shaft and is selectively rotatable to drive the second coupling unit between first, neutral and second positions. A first shift rail is operatively connected to the first pivot member and is adapted to slide axially within a shift rail guide in response to rotation of the first pivot member and a second shift rail is operatively connected to the second pivot member and is adapted to slide axially within the shift rail guide in response to rotation of the second pivot member. The first and second shift rails each comprise a lock-out detent in facing relation to one another. A lock-out plunger is positioned within the shift rail guide between the first and second shift rails and is adapted to move between a first and a second locking position only when the first and second coupling units are in the neutral position. In the first locking position, the plunger lockingly engages the lock-out detent in the first shift rail to restrict axial movement of the first shift rail without impeding axial movement of the second shift rail. In the second locking position, the plunger lockingly engages the lock-out detent in the second shift rail to restrict axial movement of the second shift rail without impeding axial movement of the first shift rail.

31 Claims, 6 Drawing Sheets

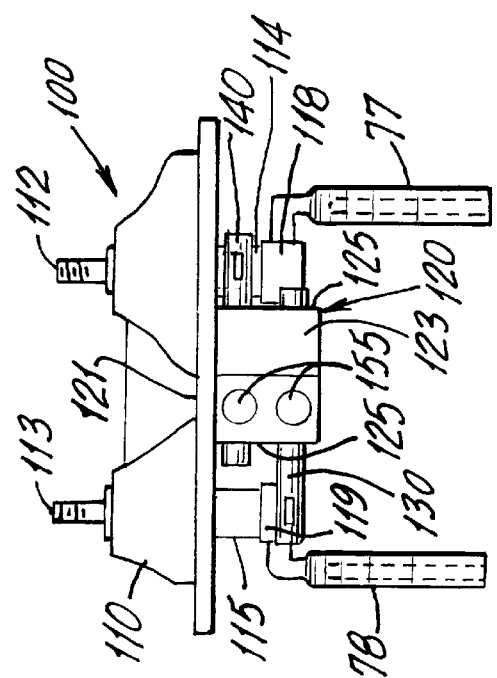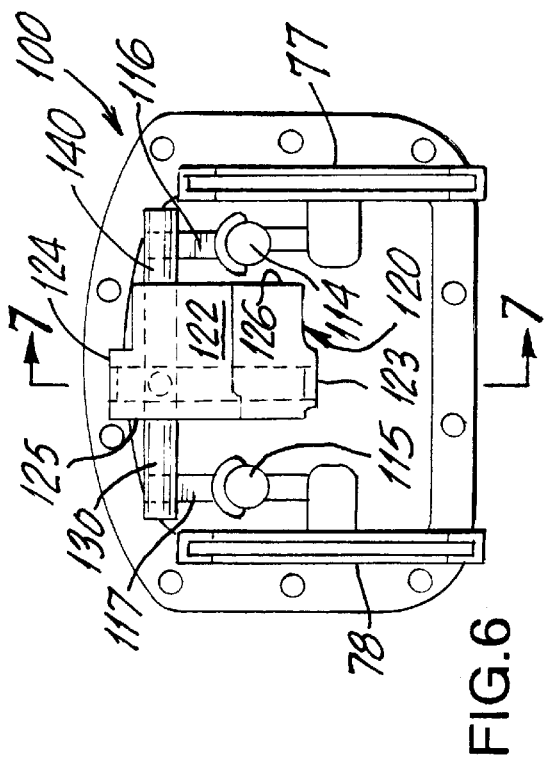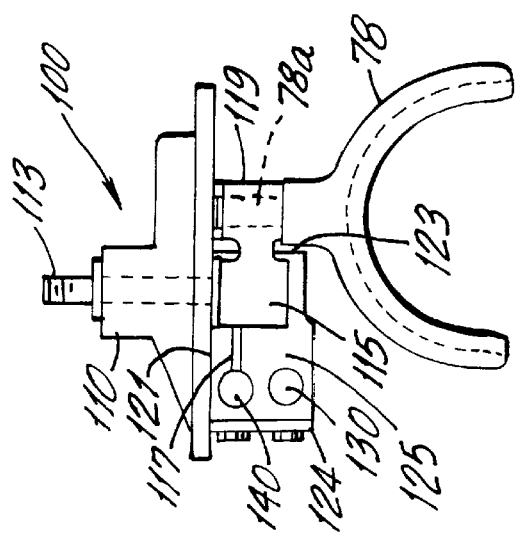

TRANSMISSION AND SHIFT MECHANISM

BACKGROUND OF THE INVENTION

1. Field of the Invention

The present invention relates generally to the field of automobile transmissions, and more particularly to an improved manual transmission and shift mechanism for a motor vehicle.

2. Description of the Related Art

Manual transmissions of the type including a lay shaft are well known in the art. Such transmissions are often utilized in connection with high performance automobiles, such as those used in connection with professional racing. In this regard, to facilitate quicker acceleration from a rolling start and to minimize the power necessary to accelerate the automobile, it is also known to use a reduction or drop gear on the lay shaft of the transmission in order to increase the rotational speed of the gear train within the transmission.

Manually shifting gears within transmissions of this type under the rigors of racing conditions, however, is frequently problematic due to the inability to precisely control the disengagement of one set of gears before engagement a second set of gears. For example, in a conventional 4-speed manual transmission, it is known to utilize a shift mechanism wherein a first shift fork is connected to and moves a first clutch ring or synchromesh unit to engage a first or second speed driven gear, and a second shift fork is connected to and moves a second clutch ring or synchromesh unit to engage a third or fourth speed driven gear of the transmission. However, such conventional shift mechanisms do not generally preclude engagement of the third or fourth speed gears while the first or second speed gears are still engaged, or vice versa, which simultaneous engagement may cause significant damage, to the components of the transmission.

In addition, once damaged, these conventional transmissions do not readily provide ease in which to replace damaged components (such as gears situated on the lay shaft). Accordingly, significant effort and expense is often required in repairing or replacing such damaged transmissions.

SUMMARY OF THE INVENTION

The foregoing and other objects and advantages are achieved in accordance with the present invention through the provision of an improved manual transmission having a self-locking gear shift mechanism to prevent simultaneous engagement of driven gears on the output shaft of the transmission.

In accordance with the present invention, a manual transmission is provided having a casing rotatably supporting an input shaft, a lay shaft and an output shaft each in parallel relationship. An input gear is fixed for rotation with the input shaft. A reduction gear is fixed for rotation with the lay shaft and in constant meshing engagement with the input gear. First through fourth speed drive gears are fixed for rotation with and spaced apart along the lay shaft. First through fourth speed driven gears are spaced apart and freely rotatable on the output shaft and the first through fourth speed driven gears are in constant meshing engagement with the first through fourth speed drive gears, respectively.

A first coupling unit is fixed to rotate with the output shaft and is selectively slidable in the axial direction on the output shaft between a first position for releasably engaging the first speed driven gear to drive the output shaft, a neutral position in non-engaged relation to the first and second speed driven gears, and a second position for releasably engaging the second speed driven gear to drive the output shaft. A second coupling unit is also fixed to rotate with the output shaft and is selectively slidable in the axial direction on the output shaft between a first position for releasably engaging the third speed driven gear to drive the output shaft, a neutral position in non-engaged relation to the third and fourth speed driven gears, and a second position for releasably engaging the fourth speed driven gear to drive the output shaft.

A shift mechanism is provided in accordance with the present invention to control the axial sliding movement of the first and second coupling units. The shift mechanism comprises a first pivot member operatively connected to the first coupling unit and selectively rotatable to drive the first coupling unit between the first, neutral and second positions. A second pivot member is operatively connected to the second coupling unit and is selectively rotatable to drive the second coupling unit between the first, neutral and second positions. A first shift rail is operatively connected to the first pivot member and is adapted to slide axially within a shift rail guide in response to rotation of the first pivot member and a second shift rail is operatively connected to the second pivot member and is adapted to slide axially within the shift rail guide in response to rotation of the second pivot member. The first and second shift rails are spaced apart from each other within the shift rail guide and the first and second shift rails each comprise a lock-out detent, the lock-out detent on the first shift rail being in facing relation to the lock-out detent on the second shift rail. A lock-out plunger is positioned within the shift rail guide between the spaced apart first and second shift rails, the lock-out plunger being adapted to move between a first and a second locking position only when the first and second coupling units are in the neutral position. In the first locking position, the plunger lockingly engages the lock-out detent in the first shift rail to restrict axial movement of the first shift rail without impeding axial movement of the second shift rail. In the second locking position, the lock-out plunger engages the lock-out detent in the second shift rail to restrict axial movement of the second shift rail without impeding axial movement of the first shift rail. Thus, in accordance with the present invention, the first and second shift rails and lock-out plunger cooperate to prevent two driven gears from being simultaneously coupled to the output shaft of the transmission.

In another aspect of the present invention, the lay shaft comprises an elongated, rigid pin member and an elongated outer sleeve member rotatably supported by the pin member, the outer sleeve member having an inner bore for loosely receiving the pin member. A bearing housing is removably attached to the transmission casing, the housing retaining an antifriction bearing for rotatably supporting an end of the lay shaft. The lay shaft is adapted to be removed from the casing upon removal of the bearing housing and the reduction gear and second through fourth speed drive gears are removably splined to the outer sleeve member.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein:

FIG. 4 is a side elevation view of a shift mechanism for use in accordance with the present invention with the transmission illustrated in FIG. 1;

FIG. 5 is a front elevation view of the shift mechanism illustrated in FIG. 4;

FIG. 6 is a bottom plan view of the shift mechanism illustrated in FIG. 4;

DESCRIPTION OF THE PREFERRED EMBODIMENTS

Figure 1:
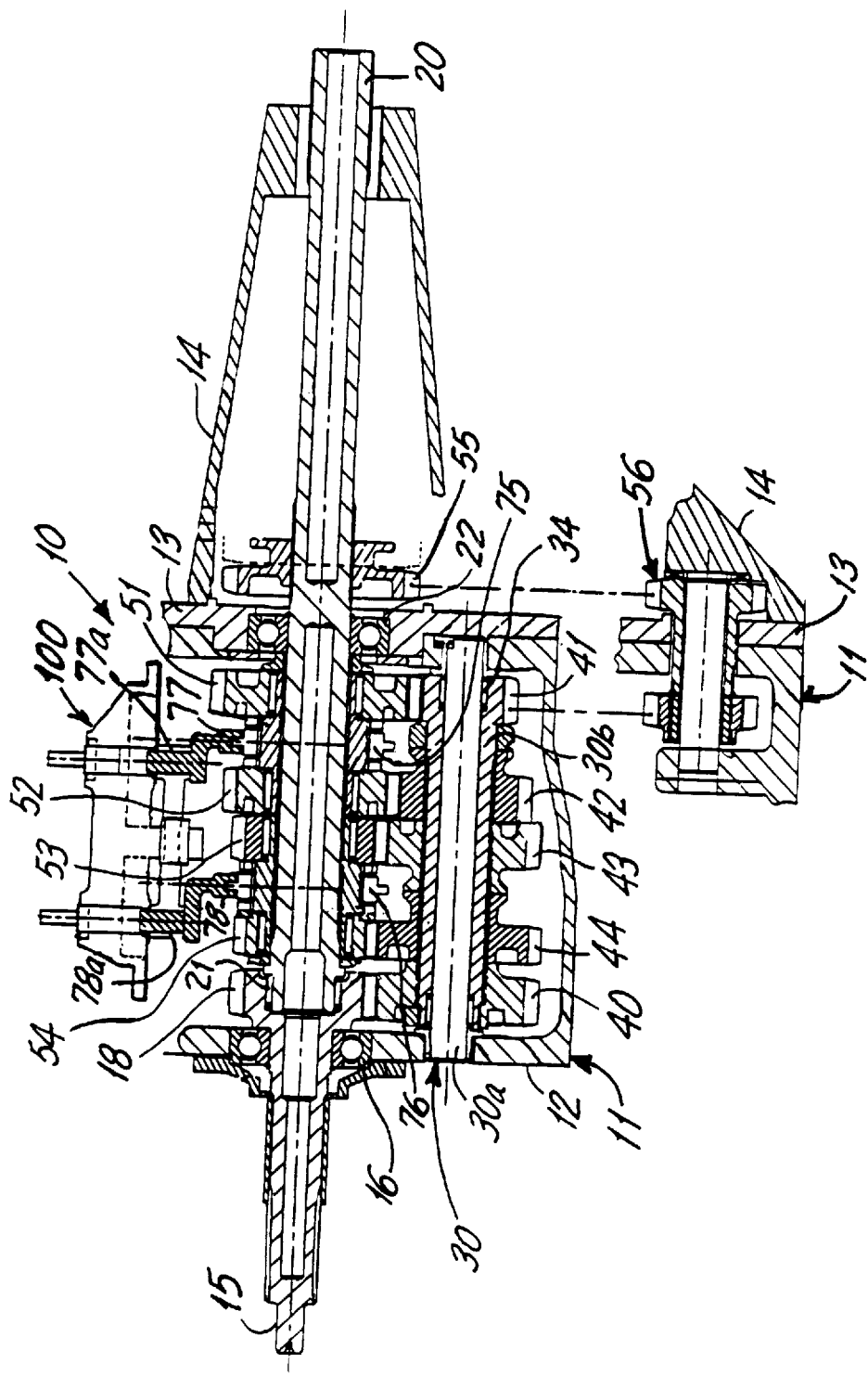
FIG. 1 is a elevational cross-sectional view of a transmission in accordance with the present invention.
Figure 2:
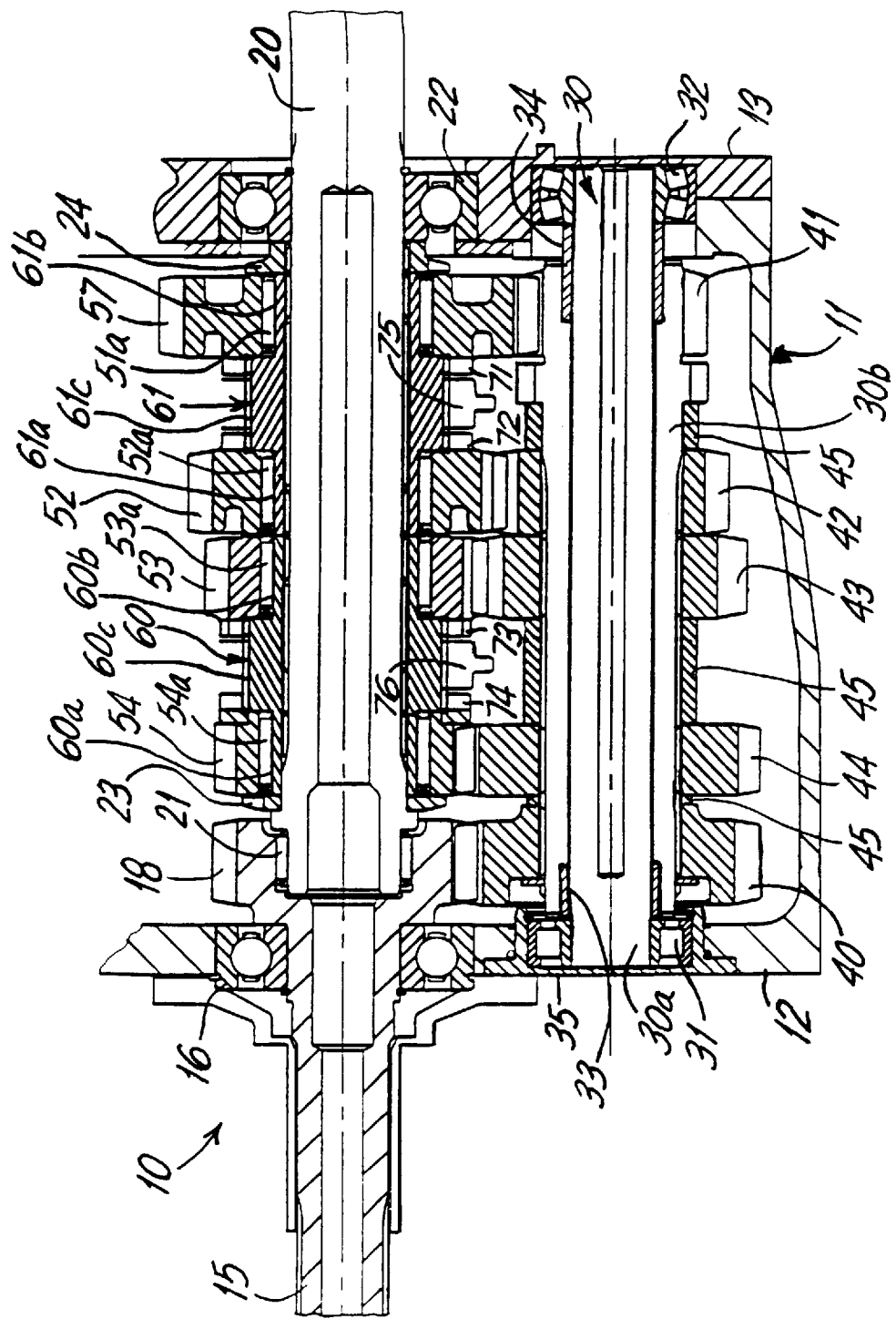
FIG. 2 is an enlarged cross-sectional view of the transmission illustrated in FIG. 1.
Figure 3:
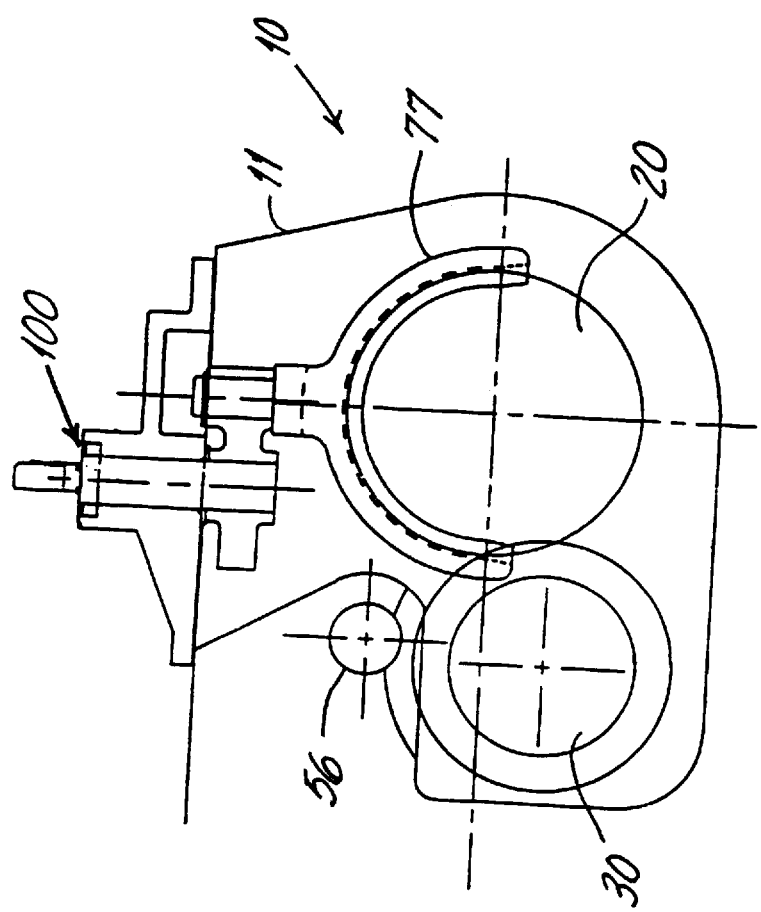
FIG. 3 is a end elevational cross-sectional view of the transmission illustrated in FIG. 1.

Referring to the drawings, and more specifically to FIGS. 1–3 thereof, there is illustrated a 4-speed manual transmission 10 for an automobile in accordance with the present invention. The transmission 10 includes a casing or bell housing 11 having a front face 12 and rear face 13. A rear extension 14 is secured to the rear face 13 of casing 11.

An input shaft 15 is received within and rotatably supported relative the casing 12 by antifriction bearing 16. The input shaft 15 receives driving torque in a conventional manner from the crankshaft (not illustrated) of the internal combustion engine in a motor vehicle. Antifriction bearing 16 is preferably a spherical roller bearing having rolling elements between an inner and an outer race of the bearing 16. The outer race is preferably press fit within an opening in the front face 12 of casing 11 and the inner race is preferably press fit onto input shaft 15.

An input gear 18 is located within the casing 12 at the distal end of the input shaft 15 and is preferably integrally formed as part of the input shaft 15. The distal end of the input shaft 15 also has a bore therein for receiving a proximal end portion of an output shaft 20 of the transmission 10. The proximal end of the output shaft 20 is rotatably supported by antifriction bearing 21, which bearing is disposed within the bore in the distal end of input shaft 15. The output shaft 20 is also rotatably supported relative the casing 11 by antifriction bearing 22, which is preferably press fit within an opening in the rear face 13 of casing 11. The distal or rearward end of output shaft 20 projects from the rear extension 14 to provide output driving torque from the transmission 10 to the motor vehicle.

Input shaft 15 and output shaft 20 are co-axially aligned with one another and are independently rotatable relative casing 11. In order to minimize the mass associated with input shaft 15 and output shaft 20, both shafts 15, 20 are rifled drilled in various locations throughout their respective lengths.

Also rotatably disposed within the casing 11 is a transmission lay shaft 30 having an axis of rotation parallel to that of input shaft 15 and output shaft 20. Referring to FIG. 2, the proximal end of lay shaft 30 is rotatably supported relative casing 11 by antifriction bearing 31 and the distal end of lay shaft 30 is rotatably supported relative casing 11 by antifriction bearing 32. Antifriction bearings 31 and 32 are preferably spherical roller bearings having rolling elements between an inner and an outer race. The outer race of bearing 31 is preferably press fit within a bearing housing 35, which is removably secured to the front face 12 of the casing 11. The inner race of bearing 31 is preferably press fit onto lay shaft 30. Similarly, the outer race of bearing 32 is preferably press fit within an opening in the rear face 13 of casing 11 and the inner race of bearing 32 is preferably press fit onto lay shaft 30.

The lay shaft 30 is preferably formed as two components: an elongated pin member 30a and an outer sleeve member 30b rotatably supported by the pin member 30a. The lay shaft pin member 30a is an elongated member that is sufficiently rigid and is preferably rifled drilled throughout most of its length to minimize the mass associated with lay shaft 30. The outer sleeve member 30b of lay shaft 30 includes a bore therethrough having a bore diameter slightly larger than the outside diameter of pin member 30a so that pin member 30a may be received within the bore of sleeve member 30b. Outer sleeve member 30b is shorter in length than pin member 30a and is rotatable relative to pin member 30a by means of antifriction bearings 33, 34 that are received within respective countersinks at each end of sleeve. member 30b.

The lay shaft 30 also includes a reduction or drop gear 40, a first speed drive gear 41, a second speed drive gear 42, a third speed drive gear 43 and a fourth speed drive gear 44. Preferably, first drive gear 41 is formed integral with lay shaft sleeve 30b, and drop gear 40 and second through fourth drive gears 42–44 are slidably affixed in the axial direction on splines formed in the outer surface of lay shaft sleeve member 30b so that gears 40, 42–44 (and spacer members 45) are readily removable from lay shaft 30. Cylindrical spacer members 45 of sufficient length may also slidably received in the axial direction on splines in the outer surface of sleeve member 30b and may be positioned between adjacent gears on the lay shaft to preclude axial movement of the gears 40–44 relative one another. Accordingly, reduction gear 40 and first through fourth drive gears 41–44 rotate with lay shaft sleeve member 30b and are generally non-rotatable relative sleeve member 30b.

The input gear 18 of input shaft 15 is continually in toothed or meshing engagement with and operable to drive reduction gear 40 of lay shaft 30, which in turn causes lay shaft sleeve member 30b and first through fourth gears 41–44 to rotate along with drop gear 40. The reduction gear 40 is larger in diameter (and has a higher number of teeth) than input gear 18, thereby allowing the gear train of the transmission 10 to rotate at a higher rate of speed to provide greater inertia and requiring less power to accelerate the motor vehicle.

To facilitate efficient and convenient inspection and replacement of the lay shaft 30, reduction gear 40 and/or first through fourth drive gears 41–44, the bearing housing 35 is readily removable from the front face 12 of transmission 10. Upon removal of housing 35, the lay shaft 35 and accompanying gears 40–44 can easily be accessed and removed from transmission 10. Because the reduction gear 40 and second through fourth gears 42–44 are in splined engagement with lay shaft sleeve 30b, such splined gears may readily be replaced by substituting a new set of gears 40, 42–44 on the lay shaft sleeve 30b, which can be installed back into the casing 11 in a manner similar to the removal of the lay shaft and gears in the first instance.

Referring now to FIGS. 1 and 3, a reverse gear 55 is provided on output shaft 20 to selectively engage with a reverse idler assembly 56 to provide reverse drive capability with respect to transmission 10.

Now, referring to FIG. 2, first, second, third and fourth speed driven gears 51–54 are rotatably mounted on output shaft 20. Preferably, generally cylindrically-shaped first and second hubs 60, 61 are affixed to output shaft 20 by sliding engagement of splines formed in a portion of the outer surface of output shaft 20 with complimentary features formed in the bore through hubs 60, 61. The hubs 60, 61 are positioned adjacent one another on output shaft 20 and are retained against axial movement on shaft 20 by thrust washers 23, 24.

Each end of hubs 60, 61 includes a reduced outside diameter portion 60a, 60b, 61a, 61b relative to a raised central portion 60c, 61c. First through fourth speed driven gears 51–54 are rotatably mounted via antifriction bearings 51a–54a on the respective reduced portions 60a, 60b, 61a, 61b of hubs 60, 61. That is, first speed driven gear 51 is rotatably mounted on reduced portion 61b of hub 61, second speed driven gear 52 is rotatably mounted on reduced portion 61a of hub 61, third speed driven gear 53 is rotatably mounted on reduced portion 60b of hub 60, and fourth speed driven gear 54 is rotatably mounted on reduced portion 60a of hub 60. As such, first through fourth speed driven gears 51–54 are freely rotatable relative output shaft 20 by antifriction bearings 51a–54a, respectively. According to the present invention, it is preferred that the teeth on gears 18, 40–44, 51–54 be straight cut. However, it is understood that the present invention is not limited to transmissions with straight cut gear teeth and that other gear tooth configurations such as beveled teeth or the like are equally applicable to the invention.

As illustrated in FIGS. 1 and 2, first speed drive gear 41 is continually in toothed or meshing engagement with and operable to drive first speed driven gear 51 of output shaft 20 to provide a first speed gear ratio. Second speed drive gear 42 is continually in toothed or meshing engagement with and operable to drive second speed driven gear 52 of output shaft 20 to provide a second speed gear ratio. Third speed drive gear 43 is continually in toothed or meshing engagement with and operable to drive third speed driven gear 53 of output shaft 20 to provide a third speed gear ratio. Fourth speed drive gear 44 is continually in toothed or meshing engagement with and operable to drive fourth speed driven gear 54 of output shaft 20 to provide a fourth speed gear ratio.

In the fourth or highest speed gear ratio, the speed of the output shaft 20 is a maximum with respect to the lay shaft 30, and thus a maximum with respect to the input shaft 15 as well. Second through fourth speed driven gears 52–54 on output shaft 20 are progressively smaller in diameter (and thus have progressively fewer teeth) than first speed driven gear 51. In contrast, second through fourth speed driving gears 42–44 on lay shaft 30 are progressively larger in diameter (and thus progressively have a higher number of teeth) than first speed driving gear 41.

Referring now to FIGS. 1 and 2, a first coupling unit 75 is slidably disposed in the axial direction on raised portion 61c of output hub 61 between the first and second speed driven gears 51, 52. Similarly, a second coupling unit 76 is slidably disposed in the axial direction on raised portion 60c of output hub 60 between the third and fourth speed driven gears 53, 54. The first coupling unit 75 engages and is adapted to be operated by shift fork 77, and the second coupling unit 76 engages and is adapted to be operated by shift fork 78. Preferably, first and second coupling units 75, 76 are conventional clutch or dog ring units. However, it is understood that the coupling units 75, 76 may also be conventional dog and synchromesh units.

Accordingly, the first coupling unit 75 is fixed to rotate with the output shaft 20 and, as will be discussed further below, is selectively slidable in the axial direction on the output shaft 20 between a first position for releasably engaging the first speed driven gear 51 to drive the output shaft 20, a neutral position in non-engaged relation to the first and second speed driven gears 51, 52, and a second position for releasably engaging the second speed driven gear 52 to drive the output shaft 20. Similarly, the second coupling unit 76 is also fixed to rotate with the output shaft 20 and, as will also be discussed further below, is selectively slidable in the axial direction on the output shaft 20 between a first position for releasably engaging the third speed driven gear 53 to drive the output shaft 20, a neutral position in non-engaged relation to the third and fourth speed driven gears 53, 54, and a second position for releasably engaging the fourth speed driven gear 54 to drive the output shaft 20.

With reference now to FIGS. 1, 3 and 4–5, transmission 10 is provided with a shift mechanism 100 for moving shift forks 77, 78 in order to shift the transmission 10 into or out of first, second, third or fourth operational gear speeds. In accordance with the present invention, shift mechanism 100 includes a cover 110 that is adapted to enclose an opening in the top of casing 11. First and second pivot rods 112, 113 are rotatably supported by and extend through cover 110 so that a proximal end of each pivot rod 112, 113 projects from the top surface of the cover 110.

The distal end of first and second pivot rods 112, 113 project from the bottom surface of cover 110 into the casing 11 and are operatively connected in a conventional manner (e.g., threadedly engaged) to first and second pivot members 114, 115, respectively, so that rotation of either pivot rod 112, 113 causes the respective pivot member 114, 115 to rotate as well. Preferably, first and second pivot members 114, 115 are cylindrical in shape and are integrally connected to first and second fork holders 118, 119, respectively. First and second fork holders 118, 119 each have a bore extending at least partially therethrough for slidably receiving an upper cylindrical portion 77a, 78a of shift forks 77, 78, respectively, Accordingly, shift forks 77, 78 are operatively connected to first and second fork holders 118, 119, respectively.

The top surface 121 of a shift rail guide 120 is secured in a conventional manner to the bottom surface of cover 110 between first and second pivot members 114, 115. The shift rail guide 120 is formed with spaced apart first and second guide holes 130', 140' therethrough for slidably receiving first and second shift rails 130, 140, respectively. Preferably, the first and second guide holes 130', 140' extend through the right and left surfaces 125, 126 of the rail guide 120 and the center lines associated with the guide holes 130', 140' are parallel to one another. The distance between the facing or adjacent surfaces of the first and second guide rails 130, 140 is generally referred to as distance L.

The first and second shift rails 130, 140 may be formed in a conventional manner from solid metal rods or other suitable material. A slot 132, 142 is formed in an end portion of first and second rails or shift levers 130, 140 for receiving first and second connecting rods 116, 117, respectively. The first and second connecting rods 116, 117 are operatively connected to, and preferably integrally formed with, the first and second pivot members 114, 115, respectively so that rotation of the first or second pivot rod 112, 113 (and thus rotation of associated pivot member 114, 115) will tend to move the corresponding first or second shift rail 130, 140 relative the shift rail guide 120.

Figure 8:
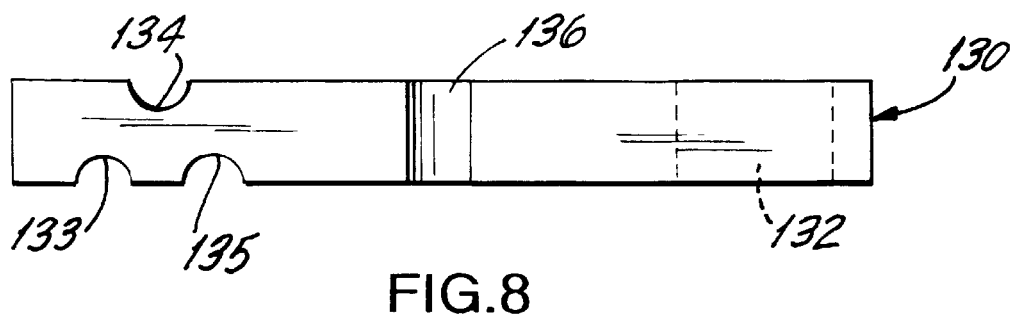
FIG. 8 is a top plan view of a shift rail for use with the shift mechanism illustrated in FIG. 4.
Figure 9:
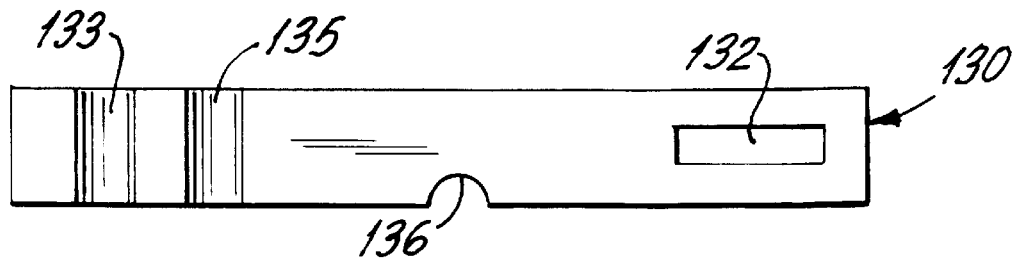
FIG. 9 is a front elevational view of the shift mechanism rail illustrated in FIG. 8.

Referring to FIGS. 8 and 9, the first and second shift rails 130, 140 are each provided with spaced apart first and second detents or tangential grooves 133, 135 or 143, 145, respectively. A neutral detent or tangential groove 134, 144 is also formed on the first and second shift rails 130, 140, respectively, between the first and second detents 133, 135 or 143, 145, but on the opposite side of first and second shift rails 130, 140 (e.g., 180° from the first and second detents).

The first and second shift rails 130, 140 also include first and second lock-out detents or tangential grooves 136, 146, respectively. The configuration of lock-out detents 136, 146 are generally the same and the depth of each lock-out detent 136, 146 is generally referred to as depth D. Lock-out detent 136 is preferably formed on the top surface of the first shift rail 130 at approximately 90° to the first and second detents 133, 135. Lock-out detent 146 is preferably formed on the bottom of the second shift rail 140 at approximately 90° to the first and second detents 143, 145.

Thus, when the first and second shift rails 130, 140 are positioned within the respective guide holes 130', 140' in shift rail guide 120, the second shift rail 140 is spaced apart from, parallel to and located above first shift rail 130. In this manner, second lock-out detent 146 formed in the bottom of the second shift rail 140 is situated above and in facing relationship with the first lock-out detent 136 formed in the top of the first shift rail 130.

Figure 7:
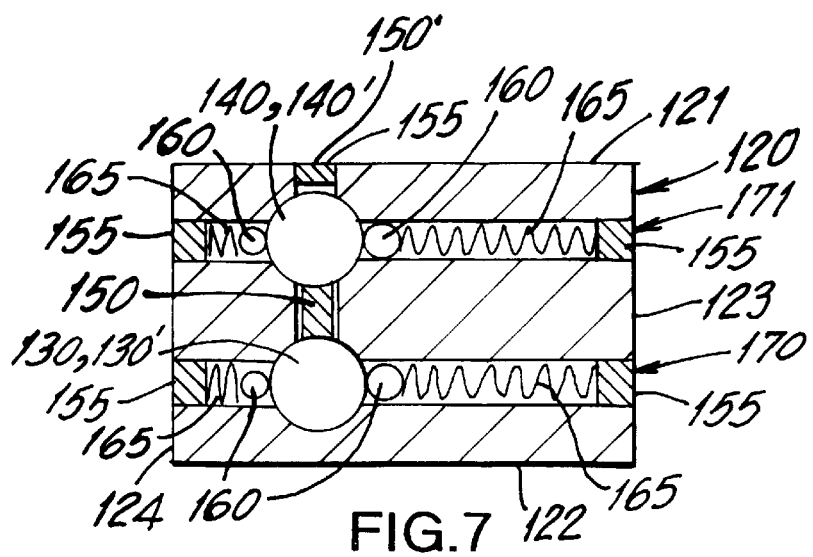
FIG. 7 is a cross sectional view the shift mechanism housing taken along line A—A illustrated in FIG. 6.

With reference to FIG. 7, the shift rail guide 120 includes first and second holes 170, 171 that extend from the front surface 123 to the rear surface 124 through the shift rail guide 120. The first and second holes 170, 171 formed in the shift rail guide 120 extend radially through the center of the first and second rail guide openings 130', 140', respectively. The centerlines of the first and second holes 170, 171 are parallel to each other and are spaced apart a distance approximately equal to the distance between the centerlines of the first and second rail guide openings 130', 140'.

When the shift rails 130, 140 are located within the rail guide openings 130', 140' of the rail guide 120, a ball bearing 160 and compression spring (or other suitable elastomeric material) 165 is inserted into the first and second holes 170, 171 on both sides of each of the first and second shift rails 130, 140. A threaded cap 155 or other conventional member may be used to retain the ball bearing/compression spring set 160, 165 within the first and second holes 170, 171.

A ball bearing 160 is therefore forced by a compression spring 165 against opposing sides of each of the shift rails 130, 140. In this manner, when the shift rails 130, 140 are moved axially within the guide openings 130', 140' of the shift rail guide 120, the ball bearings 160 are forced against the surface of the shift rails 130, 140 and cooperate with the first, second and neutral detents 133–135 or 143–145 in the shift rails 130, 140 to accurately seat the shift rails in the appropriate positions, which will be described further below.

The shift rail guide 120 also includes a lock-out opening 150' that preferably extends at least from the top surface 121 of shift rail guide 120, through the second guide hole 140' for receiving the second shift rail 140, and into the first guide hole 130' for receiving the first shift rail 130. As illustrated in FIG. 7, the centerline of the lock-out opening 150' preferably extends perpendicular to the parallel centerlines of the first and second guide holes 130', 140' within the shift rail guide 120.

A lock-out plunger 150 is slidably received in the lock-out opening 150' formed in the shift rail guide 120 so that the plunger 150 is movable in opening 150' in the axial direction between the first and second guide holes 130', 140'. The lock-out plunger 150 may be made from a hardened steel dowel and has a diameter slightly less than that of the lock-out opening 150'. Because the lock-out plunger 150 is positioned between the first and second shift rails 130, 140, it is necessary to install the plunger 150 after the first shift rail has been positioned with the shift rail guide 120, but before the second shift rail has been installed. A threaded cap 155 or other conventional member may be used to seal or close the lock-out opening 150' proximate the top surface 121 of the shift rail guide 120 after the lock-out plunger 150 is installed within the opening 150'.

Figure 10:
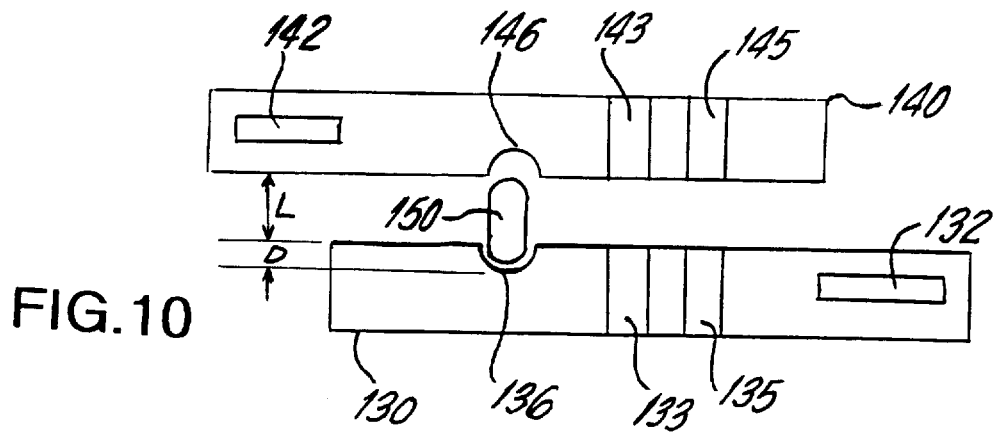
FIG. 10 is a front elevational view of corresponding shift mechanism rails in the neutral position.

With reference to FIG. 10, the length (L+D) of the lock-out plunger 150 is slightly less than the combined distance L between the bottom of the second rail 140 and the top of the first rail 130, and the depth D of lock-out detent 136 or 146. In this manner, when the first and second lock-out detents 136, 146 are aligned in facing relationship with one another, a portion of lock-out plunger 150 is always located in one of the lock-out detents 136 or 146 to impede axial movement of the corresponding shift rail 130 or 140, but not in the opposing detent 136 or 146. The ends of the lock-out plunger 150 are suitably curved or otherwise configured to correspond to the configuration of lock-out detents 136, 146 so that the plunger 150 can be guided in and out of lock-out detent 136 or 146 when one of the shift rails 130 or 140 is moved axially within the guide block 120. As such, lock-out plunger 150 may effectively preclude axial movement of one of the shift rails 130, 140 without impeding axial movement of the other.

The operation of the shift mechanism 100 and transmission 10 in accordance with the present invention is explained below. An operator of the motor vehicle is capable of changing gears within transmission 10 by a shift lever or gear shift (not shown) that is located within the driver's compartment of the automobile. The shift lever is operatively connected in a conventional manner to first and second pivot rods 112, 113 so that appropriate movement of the shift lever in a predefined pattern causes one of the pivot rods 112 or 113 to rotate with respect to the shift mechanism cover 110.

For example, movement of the shift lever by the operator to a position corresponding to first speed operation of transmission 10 causes pivot rod 112 to rotate with respect to cover 110. Such rotation of pivot rod 112 causes first pivot red member 114, first connecting rod 116 and first fork holder 118 to turn as well. Movement of the first connecting rod 116 in turn causes the second shift rail 140 to slide axially within the shift rail guide 120. With reference to FIG.

12, axial movement of second shift rail 140 causes the lock-out plunger 150 to seat itself within the lock-out detent 136 of the first shift rail 130, thereby preventing shift rail 130 from moving axially out of the neutral position until such time as the second shift rail 140 returns to the neutral position.

The second shift rail 140 continues to move axially until the spring loaded ball bearing 160 seats itself in the first detent 143. The distance traveled by the shift rail 140 between the neutral detent 144 and first detent 143 corresponds to the amount of rotation of the first fork holder 118 and attached shift fork 77 necessary to move the first clutch ring 75 into engagement with the first dog teeth 71 of the first driven gear 51. Because the first clutch ring 75 is in splined engagement and continuously rotates with respect to output shaft 20, engagement of the first clutch ring 75 with the first dog teeth 71 couples the first driven gear 51 to output shaft 20. Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the first speed drive gear 41 with the first speed driven gear 51.

Figure 12:
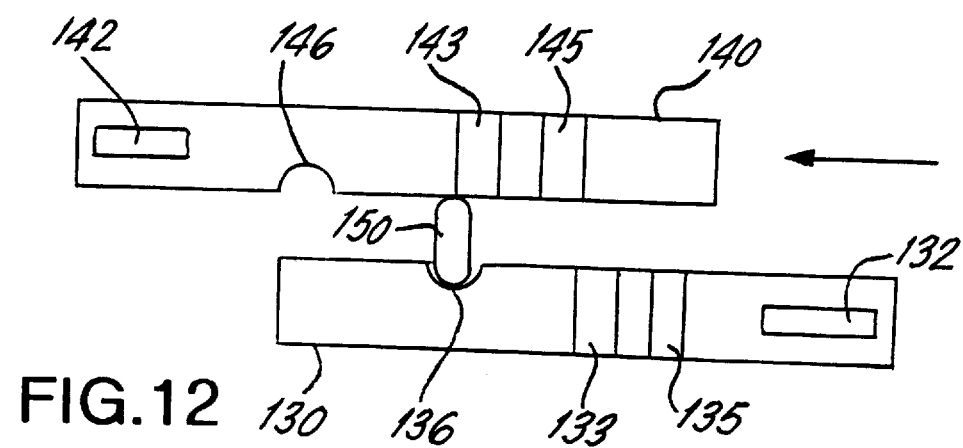
FIG. 12 is a front elevational view of corresponding shift mechanism rails in first or second speed operation.

Similarly, if the shift lever (not shown) is positioned to select second speed operation of the transmission 10, pivot rod 112 is rotated in a direction opposite to that with respect to first speed operation. Such rotation of pivot rod 112 again causes first pivot rod member 114, first connecting rod 116 and first fork holder 118 to turn, which in turn causes second shift rail 140 to slide axially within the shift rail guide 120 past the neutral position until the ball bearing 160 seats itself within the second detent 145. Referring again to FIG. 12, axial movement of second shift rail. 140 causes the lock-out plunger 150 to seat itself within the lock-out detent 136 of the first shift rail 130, thereby preventing shift rail 130 from moving axially out of the neutral position until such time as the second shift rail 140 returns to the neutral position.

As mentioned above, the second shift rail 140 continues to move axially until the spring loaded ball bearing 160 seats itself in the second detent 145. The distance traveled by the shift rail 140 between the neutral detent 144 and second detent 145 corresponds to the amount of rotation of the first fork holder 118 and attached shift fork 77 necessary to move the first clutch ring 75 into engagement with the second dog teeth 72 of the second driven gear 52 from the neutral position. Because the first clutch ring 75 is in splined engagement and continuously rotates with respect to output shaft 20, engagement of the first clutch ring 75 with the second dog teeth 72 couples the second driven gear 52 to output shaft 20. Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the second speed drive gear 42 with the second speed driven gear 52.

Furthermore, upon appropriate positioning of the shift lever (not shown) to select third speed operation of the transmission 10, pivot rod 112 is rotated back to its original position, thereby causing the second shift rail 140 to move back to the neutral position within the shift rail guide 120. In this neutral position as illustrated in FIG. 10, spring-loaded ball bearing 160 is seated in neutral detent 144 and the first and second lock-out detents 136, 146 of shift rails 130, 140 are directly aligned in facing relationship with one another.

Figure 11:
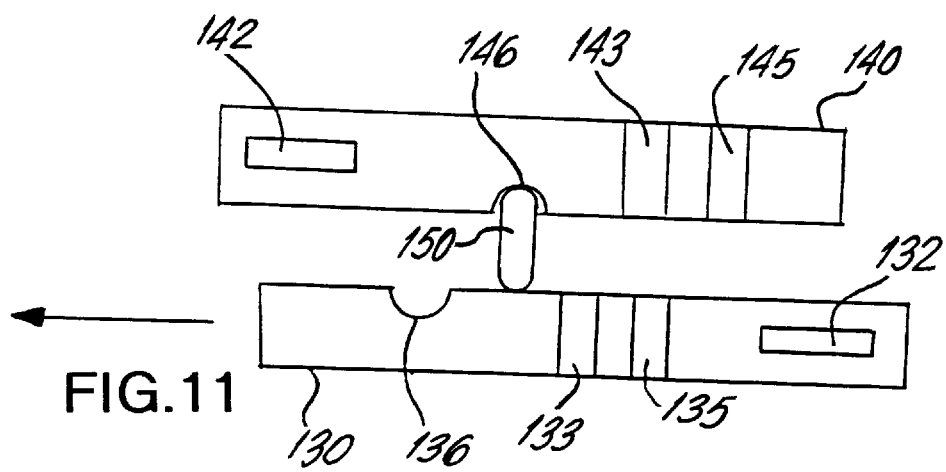
FIG. 11 is a front elevational view of corresponding shift mechanism rails in third or fourth speed operation.

Positioning of the shift lever for third speed operation further causes pivot rod 113 to rotate, which causes second pivot rod member 115, second connecting rod 117 and second fork holder 119 to turn, which, in turn, causes first shift rail 130 to slide axially within the shift rail guide 120 out of neutral position until the spring-loaded ball bearing 160 seats itself within the first detent 133. Referring to FIG. 11, axial movement of first shift rail 130 causes the lock-out plunger 150 to move axially out of detent 136 and to seat itself within the lock-out detent 146 of the second shift rail 140, thereby preventing shift rail 140 from moving axially out of the neutral position until such time as the first shift rail 130 returns to the neutral position.

As mentioned above, in third speed operation, the first shift rail 130 continues to move axially until the spring-loaded ball bearing 160 seats itself in the first detent 133. The distance traveled by the shift rail 130 between the neutral detent 134 and first detent 133 corresponds to the amount of rotation of the second fork holder 119 (and attached second shift fork 78) necessary to move the second clutch ring 76 into engagement with the third dog teeth 73 of the third driven gear 53. Because the second clutch ring 76 is in splined engagement and continuously rotates with respect to output shaft 20, engagement of the second clutch ring 76 with the third dog teeth 73 couples the third driven gear 53 to output shaft 20. Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the third speed drive gear 43 with the third speed driven gear 53.

Finally, upon appropriate positioning of the shift lever (not shown) to select fourth speed operation of the transmission 10, pivot rod 113 is caused to rotate in a direction opposite that with respect to third gear. Such rotation of pivot rod 113 again causes second pivot rod member 115, second connecting rod 117 and second fork holder 119 to turn, which, in turn, causes first shift tail 130 to slide axially within the shift rail guide 120 past the neutral position until the spring-loaded ball bearing 160 seats itself within the second detent 135. Again referring to FIG. 11, axial movement of first shift rail 130 causes the lock-out plunger 150 to move axially out of detent 136 and to seat itself within the lock-out detent 146 of the second shift rail 140, thereby preventing shift rail 140 from moving axially out of the neutral position until such time as the first shift rail 130 returns to the neutral position.

As mentioned above, in fourth speed operation, the first shift rail 130 continues to move axially until the spring-loaded ball bearing 160 seats itself in the second detent 135. The distance traveled by the shift rail 130 between the neutral detent 133 and second detent 135 corresponds to the amount of rotation of the second fork holder 119 (and attached second shift fork 78) necessary to move the second clutch ring 76 into engagement with the fourth dog teeth 74 of the fourth driven gear 54 from the neutral position. Because the second clutch ring 76 is in splined engagement and continuously rotates with respect to output shaft 20, engagement of the second clutch ring 76 with the fourth dog teeth 74 couples the fourth driven gear 54 to output shaft 20. Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the fourth speed drive gear 44 with the fourth speed driven gear 54.

Although an illustrative preferred embodiment has been described herein in detail, it should be noted and will be appreciated by those skilled in the art that numerous variations may be made within the scope of this invention without departing from the principle of this invention and without sacrificing its chief advantages. For instance, it is understood that the present invention is not limited to a four speed transmission and that the invention is equally applicable to transmissions having more than four speeds or less than four speeds. The terms and expressions have been used herein as terms of description and not terms of limitation. There is no intention to use the terms or expressions to exclude any equivalents of features shown and described or portions thereof and this invention should be defined in accordance with the claims which follow.

I claim:

1. A manual transmission, comprising:

a casing rotatably supporting an input shaft and an output shaft in parallel relationship;

first and second drive gears adapted to be driven by the input shaft;

first and second driven gears spaced apart and freely rotatable on the output shaft, the first and second driven gears being in constant meshing engagement with the first and second drive gears, respectively;

first and second coupling units fixed to rotate with the output shaft, the first coupling unit being selectively slidable in the axial direction on the output shaft between a first position for releasably engaging the first driven gear to drive the output shaft and a neutral position in non-engaged relation to the first driven gear, and the second coupling unit being selectively slidable in the axial direction on the output shaft between a second position for releasably engaging the second driven gear to drive the output shaft and a neutral position in non-engaged relation to the second driven gear;

a first pivot member operatively connected to the first coupling unit and selectively rotatable to drive the first coupling unit between the first and neutral positions;

a second pivot member operatively connected to the second coupling unit and selectively rotatable to drive the second coupling unit between the second and neutral positions;

a first shift rail operatively connected to the first pivot member and adapted to slide axially within a shift rail guide in response to rotation of the first pivot member;

a second shift rail operatively connected to the second pivot member and adapted to slide axially within the shift rail guide in response to rotation of the second pivot member, wherein the first and second shift rails are spaced apart from each other, the first and second shift rails each comprising a lock-out detent, the lock-out detent on the first shift rail being in facing relation to the lock-out detent on the second shift rail; and a lock-out plunger positioned within the shift rail guide between the spaced apart first and second shift rails, the lock-out plunger adapted to move between a first and a second locking position only when the first and second coupling units are each in the neutral position, wherein, in the first locking position, the plunger lockingly engages the lock-out detent in the first shift rail to restrict axial movement, of the first shift rail without impeding axial movement of the second shift rail, and, in the second locking position, the plunger engages the lock-out detent in the second shift rail to restrict axial movement of the second shift rail without impeding axial movement of the first shift rail.

2. The transmission according to 1, further comprising:

third and fourth drive gears adapted to be driven by the input shaft; and spaced apart third and fourth driven gears freely rotatable on the output shaft and spaced apart from the first and second driven gears, the third and fourth driven gears being in constant meshing engagement with the third and fourth drive gears, respectively;

wherein the first coupling unit is selectively slidable in the axial direction on the output shaft to a third position for releasably engaging the third driven gear to drive the output shaft and the second coupling unit is selectively slidable in the axial direction on the output shaft to a fourth position for releasably engaging the fourth driven gear to drive the output shaft.

3. The transmission according to claim 2, further comprising first and second shift forks for operatively connecting the first and second pivot members to the first and second coupling units, respectively, the first and second shift forks each having a proximal end connected to the first and second pivot members and a distal end in engagement with the first and second coupling units, respectively.

4. The transmission according to claim 2, wherein the first shift rail includes first, second and neutral detents for engaging a first bearing member located in the shift rail guide, the first bearing member being spring biased against the first shift rail so that, as the first shift rail slides axially in response to rotation of the first pivot member, the first bearing member engages the first detent when the first coupling unit is in the first position in engagement with the first driven gear, the first bearing member engages the neutral detent when the first coupling unit is in the neutral position in non-engaged relation to the first and third driven gears, and the first bearing member engages the second detent in the first shift rail when the first coupling unit engages the third driven gear.

5. The transmission according to claim 3, wherein the second shift rail includes first, second and neutral detents for engaging a second bearing member located in the shift rail guide, the second bearing member being spring biased against the second shift rail so that, as the second shift rail slides axially in response to rotation of the second pivot member, the second bearing member engages the first detent in the second shift rail when the second coupling unit is in the second position in engagement with the second driven gear, the second bearing member engages the neutral detent of the second shift rail when the second coupling unit is in the neutral position in non-engaged relation to the second and fourth driven gears, and the second bearing member engages the second detent in the second shift rail when the second coupling unit engages the fourth driven gear.

6. The transmission according to claim 1, wherein the first and second coupling units are clutch ring units.

7. The transmission according to claim 1, wherein the first and second coupling units are synchromesh units.

8. The transmission according to claim 2, further comprising:

a lay shaft rotatably supported by the casing and in generally parallel relation to the input and output shafts;

an input gear fixed to the input shaft; and a reduction gear fixed to the lay shaft and in constant meshing engagement with the input gear to transmit torque from the input shaft to the lay shaft, wherein the first through fourth drive gears are fixed to the lay shaft.

9. The transmission according to claim 8, wherein the lay shaft comprises an elongated, rigid pin member and an elongated outer sleeve member rotatably supported by the pin member, the outer sleeve member having an inner bore for loosely receiving the pin member.

10. The transmission according to claim 9, wherein the reduction gear and second through fourth speed drive gears are removably splined to the outer sleeve member.

11. The transmission according to claim 10, further comprising a bearing housing removably attached to the casing, the housing retaining an antifriction bearing for rotatably supporting an end of the lay shaft, wherein the lay shaft is adapted for removal from the casing upon removal of the bearing housing.

12. The transmission according to claim 8, wherein the axis of rotation of the input and output shafts are collinear.

13. A manually-shifted transmission, comprising:
   a casing;
   an input shaft rotatably supported relative the casing and adapted to receive input drive torque from a source of rotary power, the input shaft defining an input axis of rotation;
   an output shaft rotatably supported relative the casing and adapted to provide output drive torque from the transmission, the output shaft defining an output axis of rotation;
   a lay shaft rotatably supported relative the casing and adapted to transmit input torque from the input shaft to the output shaft, the lay shaft defining a lay shaft axis of rotation in generally parallel relation to the axes of rotation of the input and output shafts;
   an input gear having a set of peripheral teeth and fixed to the input shaft;
   a reduction gear fixed to the lay shaft, the reduction gear having a set of peripheral teeth in constant meshing engagement with the gear teeth of the input gear to transmit torque from the input shaft to the lay shaft;
   first through fourth speed drive gears fixed to and spaced apart on the lay shaft, each drive gear having a set of peripheral teeth;
   first through fourth speed driven gears spaced apart and freely rotatable on the output shaft, the first through fourth speed driven gears having a set of peripheral teeth in constant meshing engagement with the first through fourth speed drive gears, respectively;
   a first clutch ring unit being fixed to rotate with the output shaft, the first clutch ring unit being selectively slidable in the axial direction on the output shaft between a first position for releasably engaging the first speed driven gear to drive the output shaft, a neutral position in non-engaged relation to the first and second speed driven gears, and a second position for releasably engaging the second speed driver gear to drive the output shaft;
   a second clutch ring unit being fixed to rotate with the output shaft, the second clutch ring unit being selectively slidable in the axial direction on the output shaft between a first position for releasably engaging the third speed driven gear to drive the output shaft, a neutral position in non-engaged relation to the third and fourth speed driven gears, and a second position for releasably engaging the fourth speed driven gear to drive the output shaft;
   a first pivot member operatively connected to the first clutch ring unit and selectively rotatable to drive the first clutch unit between the first, neutral and second positions;
   a second pivot member operatively connected to the second clutch ring, unit and selectively rotatable to drive the second clutch unit between the first, neutral and second positions;
   a first shift rail operatively connected to the first pivot member and adapted to slide axially within a shift rail guide in response to rotation of the first pivot member;
   a second shift rail operatively connected to the second pivot member and adapted to slide axially within the shift rail guide in response to rotation of the second pivot member, the first and second shift rails spaced apart from one other and each comprising a lock-out detent, the lock-out detent on the first shift rail being in facing relation to the lock-out detent on the second shift rail; and
   a lock-out plunger positioned within the shift rail guide between the spaced apart first and second shift rails, the lock-out plunger adapted to move between a first and a second locking position only when the first and second clutch ring units are in the neutral position, wherein, in the first locking position, the plunger lockingly engages the lock-out detent in the first shift rail to restrict axial movement of the first shift rail without impeding axial movement of the second shift rail, and, in the second locking position, the plunger lockingly engages the lock-out detent in the second shift rail to restrict axial movement of the second shift rail without impeding axial movement of the first shift rail.

14. The transmission according to claim 13, further comprising first and second shift forks for operatively connecting the first and second pivot members to the first and second coupling units, respectively, the first and second shift forks each having a proximal end connected to the first and second pivot members and a distal end in engagement with the first and second coupling units, respectively.

15. The transmission according to claim 13, wherein the first shift rail includes first, second and neutral detents for engaging a first positioning member located in the shift rail guide, the first positioning member being spring biased against the first shift rail so that as the first shift rail slides axially in response to rotation of the first pivot member, the first positioning member engages the first detent when the first coupling unit is in the first position in engagement with the first speed driven gear, the first positioning member engages the neutral detent when the first coupling unit is in the neutral position in non-engaged relation to the first and second speed driven gears, and the first positioning member engages the second detent when the first coupling unit is in the second position in engagement with the second speed driven gear.

16. The transmission according to claim 15, wherein the second shift rail includes first, second and neutral detents for engaging a second positioning member located in the shift rail guide, the second positioning member being spring biased against the second shift rail so that as the second shift rail slides axially in response to rotation of the second pivot member, the second positioning member engages the first detent in the second shift rail when the second coupling unit is in the first position in engagement with the third speed driven gear, the second positioning member engages the neutral detent of the second shift rail when the second coupling unit is in the neutral position in non-engaged relation to the third and fourth speed driven gears, and the second positioning member engages the second detent of the second shift rail when the second coupling unit is in the second position in engagement with the fourth speed driven gear.

17. The transmission according to claim 16, wherein the first and second positioning members comprise a ball bearing slidingly received within first and second holes in the shift rail guide, respectively.

18. The transmission according to claim 13, wherein the first and second coupling units are clutch ring units.

19. The transmission according to claim 13, wherein the first and second coupling units are synchromesh units.

20. The transmission according to claim 13, wherein the peripheral teeth on the input gear, reduction gear, first through fourth speed drive gears and first through fourth speed driven gears are straight cut teeth.

21. The transmission according to claim 13, wherein the lay shaft comprises an elongated, rigid pin member and an elongated outer sleeve member rotatably supported by the pin member, the outer sleeve member having an inner bore for loosely receiving the pin member.

22. The transmission according to claim 21, wherein the reduction gear and second through fourth speed drive gears are removably splined to the outer sleeve member.

23. The transmission according to claim 13, further comprising a bearing housing removably attached to the casing, the housing retaining an antifriction bearing for rotatably supporting an end of the lay shaft, wherein the lay shaft is adapted to be removed from the casing upon removal of the bearing housing.

24. The transmission according to claim 13, wherein the axis of rotation of the input and output shafts are collinear.

25. A shift mechanism for a manual transmission having first through fourth speed driven gears freely rotatable on an output shaft of the transmission and in continuous meshing engagement with respective first through fourth speed driving gears, and first and second coupling units fixed to rotate with the output shaft, the first coupling unit being adapted to selectively slide in the axial direction on the output shaft to couple the first or second driven gear to the output shaft and the second coupling unit being adapted to selectively slide in the axial direction on the output shaft to couple the third or fourth driven gear to the output shaft, the shift mechanism comprising:

a first pivot member operatively connected to the first coupling unit and selectively rotatable to slide the first coupling unit on the output shaft to engage the first or second gear;

a second pivot member operatively connected to the second coupling unit and selectively rotatable to slide the second coupling unit to engage the third or fourth gear;

a first shift rail operatively connected to the first pivot member and adapted to slide axially within a shift rail guide in response to rotation of the first pivot member;

a second shift rail operatively connected to the second pivot member and adapted to slide axially within the shift rail guide in response to rotation of the second pivot member, wherein the first and second shift rails are spaced apart from each other within the shift rail guide and the first and second shift rails each comprise a lock-out detent, the lock-out detent on the first shift rail being in facing relation to the lock-out detent on the second shift rail; and a lock-out plunger positioned within the shift rail guide between the spaced apart first and second shift rails, the lock-out plunger adapted to move between a first and a second locking position only when the first and second coupling units are disengaged from the first through fourth driven gears, wherein, in the first locking position, the plunger lockingly engages the lock-out detent in the first shift rail to restrict axial movement of the first shift rail without impeding axial movement of the second shift rail, and, in the second locking position, the plunger lockingly engages the lock-out detent in the second shift rail to restrict axial movement of the second shift rail without impeding axial movement of the first shift rail.

26. The shift rail mechanism according to claim 25, further comprising first and second shift forks for operatively connecting the first and second pivot members to the first and second coupling units, respectively, the first and second shift forks having a proximal end connected to the first and second pivot members and a distal end in engagement with the first and second coupling units, respectively.

27. The shift mechanism according to claim 25, wherein the first shift rail includes first, second and neutral detents for engaging a first positioning member located in the shift rail guide, the first positioning member being spring biased against the first shift rail so that as the first shift rail slides axially in response to rotation of the first pivot member, the first positioning member engages the first detent when the first coupling unit engages the first speed driven gear, the first positioning member engages the neutral detent when the first coupling unit is disengaged from the first and second speed driven gears, and the first positioning member engages the second detent when the first coupling unit engages the second speed driven gear.

28. The shift mechanism according to claim 27, wherein the second shift rail includes first, second and neutral detents for engaging a second positioning member located in the shift rail guide, the second positioning member being spring biased against the second shift rail so that as the second shift rail slides axially in response to rotation of the second pivot member, the second positioning member engages the first detent in the second shift rail when the second coupling unit engages the third speed driven gear, the second positioning member engages the neutral detent in the second shift rail when the second coupling unit is disengaged from the third and fourth speed driven gears, and the second positioning member engages the second detent in the second shift rail when the second coupling unit engages the fourth speed driven gear.

29. The transmission according to claim 28, wherein the first and second positioning members comprise a ball bearing slidingly received within first and second holes in the shift rail guide, respectively.

30. The shift mechanism according to claim 25, wherein the first and second coupling units are clutch ring units.

31. The shift mechanism according to claim 25, wherein the first and second coupling units are synchromesh units.

* * * * *

UNITED STATES PATENT AND TRADEMARK OFFICE
CERTIFICATE OF CORRECTION

PATENT NO. : 5,816,101
DATED : October 6, 1998
INVENTOR(S) : Bevan Weston

It is certified that error appears in the above-identified patent and that said Letters Patent is hereby corrected as shown below:

Column 13, line 53 (claim 13), change "driver", to --driven--.

Signed and Sealed this

Second Day of March, 1999

Attest:

Q. TODD DICKINSON

*Attesting Officer*  *Acting Commissioner of Patents and Trademarks*